Patented Sept. 25, 1923.

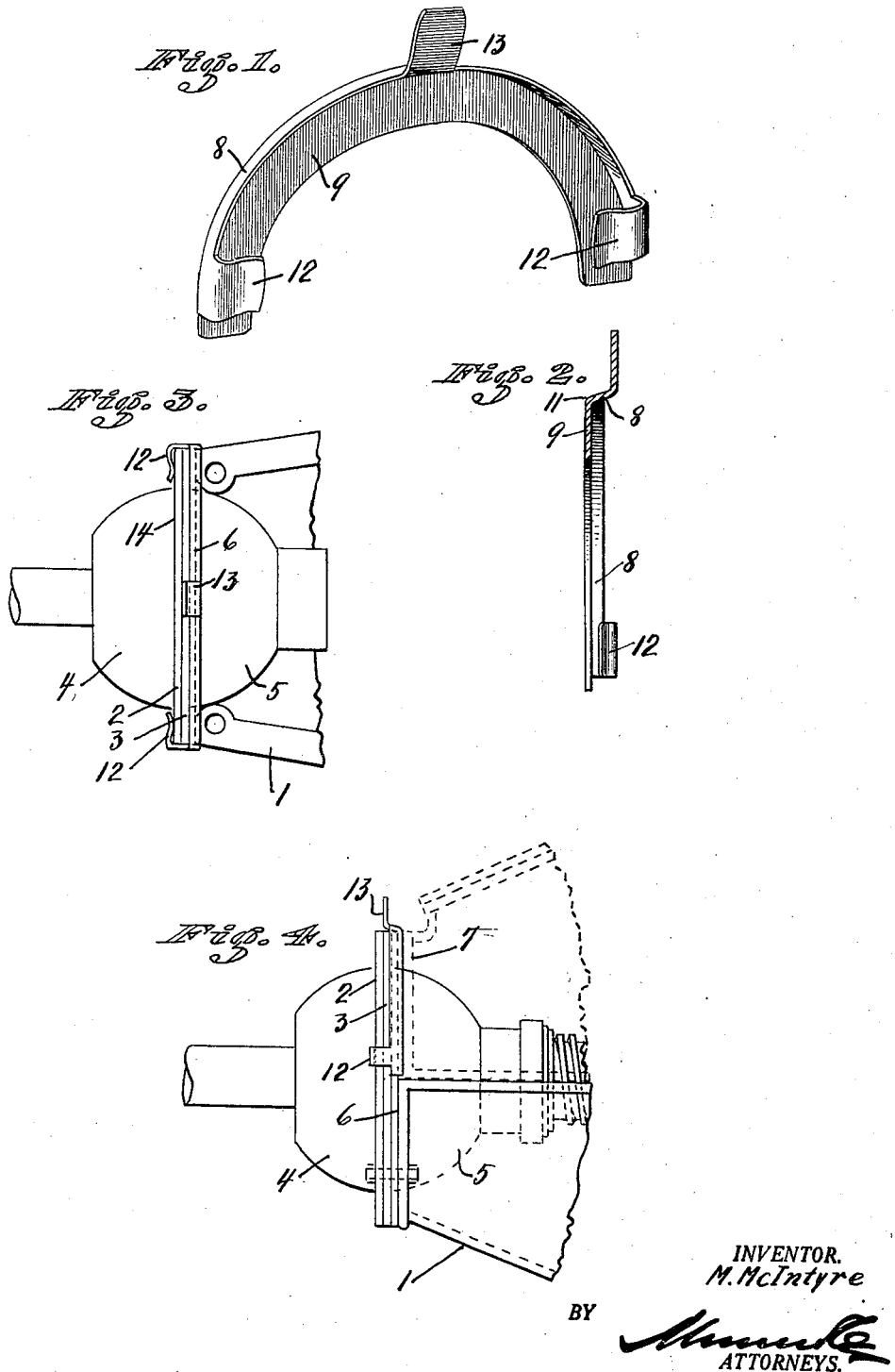

1,468,824

UNITED STATES PATENT OFFICE.

MILES McINTYRE, OF HEALDSBURG, CALIFORNIA.

GASKET PROTECTOR.

Application filed January 9, 1922. Serial No. 528,065.

*To all whom it may concern:*

Be it known that I, MILES McINTYRE, a citizen of the United States, and a resident of Healdsburg, county of Sonoma, State of California, have invented a new and useful Gasket Protector, of which the following is a specification.

The present invention relates to improvements in gasket protectors and has particular reference to means for protecting a gasket disposed between two metallic surfaces where the arrangement is such that in assembling a device, one of the metallic surfaces instead of being brought into engagement with the other face by an endwise motion has to be inserted into a limited space by lateral motion, which would tend to bend over and smash the edge of a gasket introduced before the second element is inserted. Such a condition may be frequently met under various circumstances, and while my device is particularly designed to meet a certain condition on a well known type of a motor vehicle, the invention should not be construed as being confined to this particular condition. My device is particularly designed to be used in connection with the transmission cover of a Ford transmission case. The rear end of this transmission case is joined to a ball-shaped housing for a universal joint and a gasket is disposed between the transmission case and a flange on the said housing. If the transmission cover, which comprises substantially the upper half of the transmission case, is removed for the purpose of effecting certain repairs in the transmission bands or the like, the gasket remains in place and the transmission cover can be replaced only by being made to pass this gasket in a lateral direction, and it frequently happens since the space for the transmission cover is limited that the rear edge of the same, instead of passing the gasket, strikes the edge of the same, and thereby smashes it, decreasing its usefulness. It is proposed in the present invention to provide a protector for the edge of the gasket which will guide the transmission cover past the gasket and which can be withdrawn after the transmission cover is in place.

The preferred form of my invention is illustrated in the accompanying drawing in which Figure 1 shows a perspective view of my gasket protector, Figure 2 a vertical section through the same, Figure 3 a top plan view of my gasket protector as applied to the rear end of a transmission case of the character described, and Figure 4 a side elevation of my gasket protector in the same arrangement. While I have shown only the preferred form of the invention it should be understood that various changes or modifications may be made within the scope of the claims hereto attached without departing from the spirit of the invention.

In Figures 3 and 4 is shown the general arrangement of the rear end of a transmission case of the character described comprising the main or lower half (1) of the transmission case lying against the flanges (2) and (3) of the two portions (4) and (5) of a spherical housing with a gasket (6) interposed between the transmission case and the said flanges. The transmission cover (7) shown in dotted lines in Figure 4 constitutes the upper half of the transmission case, and also lies with its rear end against the gasket (6). When this transmission cover has been removed it can be replaced only by approaching the case laterally, and since the space into which it has to be placed is limited it usually happens that its rear edge strikes the edge of the upper half of the gasket tending to bend the same or to compress the whole gasket thereby destroying its usefulness.

My device is designed to protect the gasket while the transmission cover is inserted and comprises a thin strip (8) of protective material, preferably metal, bent into semi-circular form and adapted to engage the edge of the gasket and also the edge of the flanges (2) and (3) against which the gasket lies. It is provided with a flange (9) extending downwardly from its front edge which latter flange is adapted to lie against the face of the gasket. The members (8) and (9) are preferably disposed to one another at an angle of somewhat more than ninety degrees as shown in Figure 2, and the edge along which they are joined is rounded as shown at (11) so as to facilitate the passing of the transmission cover. To hold the gasket protector in place during the operation I provide clasps (12) associated with its rear edge, adapted to engage the rear edge of the flange (2) and a small lug (13) may be provided in the central portion of the gasket holder for facilitating its withdrawal.

The manner of using my device should be readily understood from the foregoing description. If it is desired to replace the transmission cover, my protector is slipped over the upper half of the flanges (2) and (3) and the gasket, and held in place by means of the clasps (12) engaging the rear face (14) of the flange (2). Now the transmission cover may be inserted in its place without any danger of its crumbling the gasket. The rounded edge (11) of the gasket protector serves as a guide for the rear edge of the transmission cover. After the latter has been inserted the gasket protector may be withdrawn whereupon the transmission cover may be secured by means of bolts or whatever means are provided for that purpose.

I claim:

1. Means for protecting a gasket lying against a base element when inserting a second element laterally comprising a member adapted to rest on the edge of the base element and having a flange thereon for covering the edge of the gasket so as to shield the latter from the passing second element.

2. Means for protecting a gasket lying against a base element when inserting a second element laterally comprising a member adapted to rest on the edge of the base element and having a flange thereon for covering the edge of the gasket so as to shield the latter from the passing second element, the member resting on the edge of the base element being provided with clasps for engaging the rear face of said element for holding the protecting means in place.

3. A gasket protector of the character described comprising a strip of protecting material bent to overlie the edge of the gasket and having a flange thereon adapted to cover the face of the gasket.

4. A gasket protector of the character described comprising a strip of protecting material bent to overlie the edge of the gasket and having a flange thereon adapted to cover the face of the gasket, and means for holding the protector in place.

5. A device of the character described comprising a strip of protecting material bent into semi-circular form having a flange depending from one edge and spring clasps associated with the opposite edge.

MILES McINTYRE.